(12) United States Patent
Pacheco et al.

(10) Patent No.: US 9,803,406 B2
(45) Date of Patent: Oct. 31, 2017

(54) DEFORMABLE STOW BOX DOOR HINGE

(71) Applicant: AMI Industries, Inc., Colorado Springs, CO (US)

(72) Inventors: Chad R. Pacheco, Colorado Springs, CO (US); Timothy Brownsberger, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 0 days.

(21) Appl. No.: 15/181,199

(22) Filed: Jun. 13, 2016

(65) Prior Publication Data

US 2016/0281404 A1 Sep. 29, 2016

Related U.S. Application Data

(62) Division of application No. 14/282,432, filed on May 20, 2014, now Pat. No. 9,388,615.

(51) Int. Cl.
*E05D 1/00* (2006.01)
*E05D 7/12* (2006.01)
(Continued)

(52) U.S. Cl.
CPC ............ *E05D 7/12* (2013.01); *A47C 7/58* (2013.01); *B64D 11/064* (2014.12); *E05D 1/02* (2013.01);
(Continued)

(58) Field of Classification Search
CPC ........... Y10T 16/53888; Y10T 16/5389; Y10T 16/53835; Y10T 16/5383; Y10T 16/5381; Y10T 16/538; Y10T 16/531; Y10T 16/5257; Y10T 16/5253; Y10T 16/525; Y10T 16/521; Y10T 16/52; B64D 11/00; B64D 11/06; B64D 11/02; B64D 11/0601; B64D 11/0602; B64D 11/0611; B64D 11/0619; B64D 11/0627; B64D 11/0629; B64D 11/0631; B64D 11/0632;
(Continued)

(56) References Cited

U.S. PATENT DOCUMENTS 2,557,048 A 6/1951 Haase
2,576,996 A * 12/1951 Castedello ............ G03B 17/02
16/308
(Continued)

FOREIGN PATENT DOCUMENTS

CH 638029 A5 * 8/1983 ............... F23Q 2/40
DE NL 1001022 C1 * 10/1995 ........... H01R 13/447
FR 1450820 6/1966

OTHER PUBLICATIONS

Extended European Search Report dated Oct. 5, 2015 in European Application No. 15168339.8.
(Continued)

*Primary Examiner* — Chuck Mah
(74) *Attorney, Agent, or Firm* — Snell & Wilmer, L.L.P.

(57) ABSTRACT

As described herein, a hinge system may comprise one or more a guide wire hinges. In general, the guide wire hinges may be unitary members having a generally constant diameter. A pair of guide wire hinges may be utilized to hingeably couple a stow box door to the stow box housing. The hinge system may be configured to be deformable in response to experiencing a warping.

4 Claims, 5 Drawing Sheets

(51) Int. Cl.
  *E05D 7/00* (2006.01)
  *E05D 1/02* (2006.01)
  *B64D 11/06* (2006.01)
  *A47C 7/58* (2006.01)
  *E05D 11/00* (2006.01)

(52) U.S. Cl.
  CPC ............... *E05D 7/00* (2013.01); *E05D 11/00* (2013.01); *E05Y 2800/342* (2013.01); *Y10T 16/5253* (2015.01)

(58) Field of Classification Search
  CPC ............ B64D 11/0633; B64D 11/0636; B64D 11/0691; E05F 1/123; E05F 1/1246; E05F 1/1207; E05F 1/1215; E05F 1/1284; E05F 1/1016; E05F 1/1033; E05F 1/1083
  See application file for complete search history.

(56) References Cited

U.S. PATENT DOCUMENTS

| | | | |
|---|---|---|---|
| 2,602,957 A | 7/1952 | Anderson | |
| 2,869,959 A | 1/1959 | Kesling | |
| 3,067,453 A * | 12/1962 | Lyons | E05F 1/123 16/308 |
| 3,297,151 A * | 1/1967 | Palson | A47F 3/145 206/45.23 |
| 3,338,391 A * | 8/1967 | Palson | G09F 5/02 206/45.23 |
| 3,402,508 A | 9/1968 | Kessler | |
| 3,949,801 A * | 4/1976 | Sasaki | E05D 1/04 16/75 |
| 4,158,271 A * | 6/1979 | Barry | E05D 11/1078 16/75 |
| 4,332,055 A * | 6/1982 | Rudnick | E05D 11/1042 16/335 |
| 4,439,750 A * | 3/1984 | Fujii | H01F 7/08 335/274 |
| 4,524,438 A | 6/1985 | Einhaus | |
| 4,706,056 A * | 11/1987 | McCullough | H01H 50/26 335/128 |
| 4,785,501 A * | 11/1988 | Obana | E05F 1/123 16/308 |
| 5,127,133 A * | 7/1992 | Brucker | E04D 13/0722 16/373 |
| 5,240,319 A | 8/1993 | Koga | |
| 5,272,789 A | 12/1993 | Mitchell et al. | |
| 5,664,289 A * | 9/1997 | Wolda | E05F 1/1238 16/298 |
| 5,771,540 A | 6/1998 | Carpenter | |
| 6,155,443 A * | 12/2000 | Benedetti | A45C 13/007 220/4.22 |
| 6,510,588 B2 | 1/2003 | Eromaki | |
| 6,920,994 B2 * | 7/2005 | Lin | B65F 1/163 16/85 |
| 7,605,511 B2 | 10/2009 | Oowatari | |
| 7,743,466 B2 | 6/2010 | Tu | |
| 7,753,227 B2 | 7/2010 | Guo | |
| 2004/0011804 A1 | 1/2004 | Yanagihara | |
| 2013/0097809 A1 * | 4/2013 | Weber | B60N 2/4633 16/308 |
| 2014/0061216 A1 | 3/2014 | Lee | |
| 2015/0337576 A1 | 11/2015 | Pacheco | |

OTHER PUBLICATIONS

U.S. Restriction Requirement dated Jun. 11, 2015 in U.S. Appl. No. 14/282,432.
U.S. Pre-Interview Communication Office Action dated Oct. 22, 2015 in U.S. Appl. No. 14/282,432.
U.S. Non-Final Office Action dated Dec. 23, 2015 in U.S. Appl. No. 14/282,432.
U.S. Notice of Allowance dated Mar. 14, 2016 in U.S. Appl. No. 14/282,432.

* cited by examiner

DEFORMABLE STOW BOX DOOR HINGE

CROSS-REFERENCE TO RELATED APPLICATIONS

This U.S. Divisional Patent Application claims priority to U.S. Non-Provisional patent application Ser. No. 14/282,432 entitled "DEFORMABLE STOW BOX DOOR HINGE," that was filed on May 20, 2014, which is incorporated herein by reference.

FIELD

The present disclosure relates to a hinge, and more specifically, to a stow box door hinge configured to deform.

BACKGROUND

Historical cabin attendant seat (CAS) stow box door hinge systems included several hinge halves and pins along with multiple pieces of hardware utilized to attach the stow box door to a housing and/or the floor pan. For instance, in many cases a hinge similar to a piano hinge was employed. This conventional system is effective at holding the loads for normal operation of the door but does not have inherent flexibility and may transmit excessive loads to the latching and mounting points of the door on the housing.

SUMMARY

In various embodiments, a hinge system is described. The hinge system may include a unitary guide wire comprising a first end and a second end. The hinge system may include a first side wall of a housing comprising a first blind retention hole. The hinge system may include a housing door comprising an integral through-hole and undercut retention structure. The unitary guide wire may pass through the through-hole. The first end of the unitary guide wire may be is press fit into the first blind retention hole. The second end of the unitary guide wire may be press fit into the undercut retention structure. The hinge system may be configured to be deformable in response to experiencing a warping.

According to various embodiments, a guide wire hinge is disclosed. The guide wire hinge may comprise a first end, a second end, a body having a constant diameter and an angled portion of the body comprising an angle of about 90 degrees, wherein the guide wire hinge is configured to be deformable in response to experiencing a warping.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

Additionally, any reference to without contact (or similar phrases) may also include reduced contact or minimal contact. Furthermore, any reference to singular includes plural embodiments, and any reference to more than one component or step may include a singular embodiment or step. Different cross-hatching is used throughout the figures to denote different parts but not necessarily to denote the same or different materials.

Figure 1:
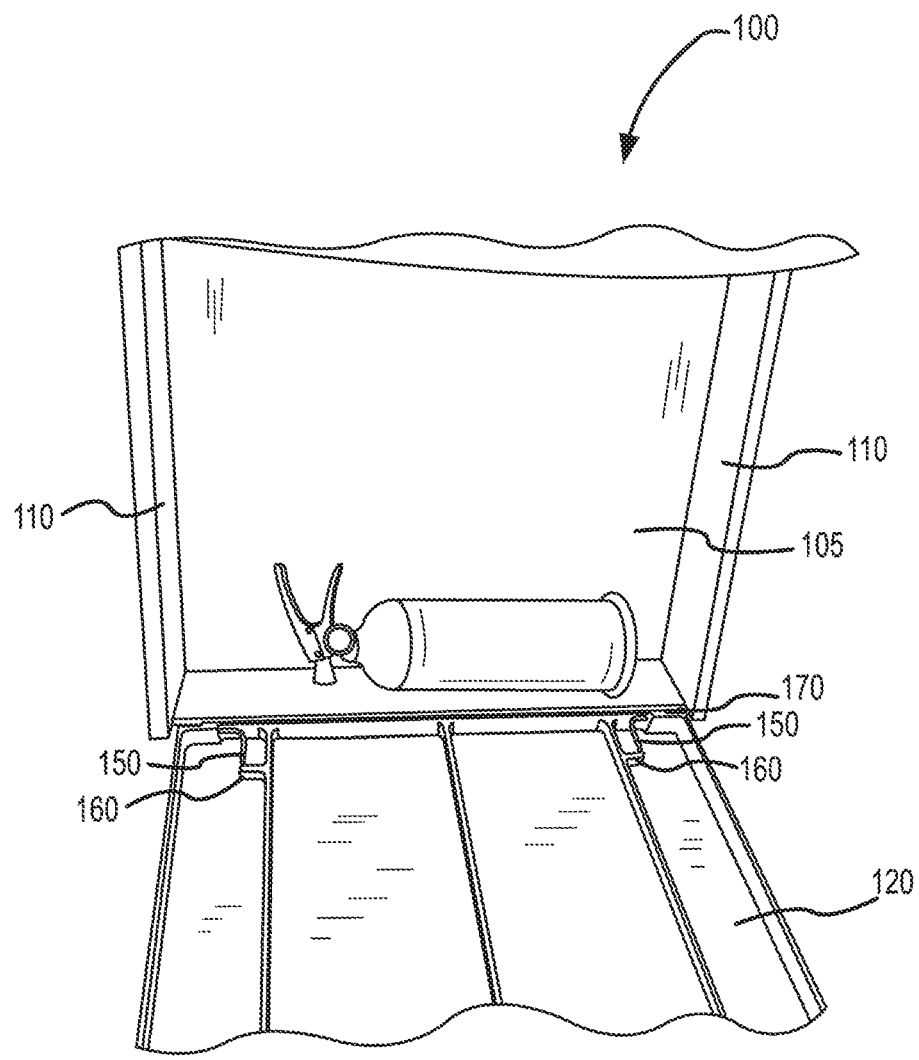
FIG. 1 illustrates a front view of an open CAS stow box comprising a hinge system according to various embodiments.
Figure 5:
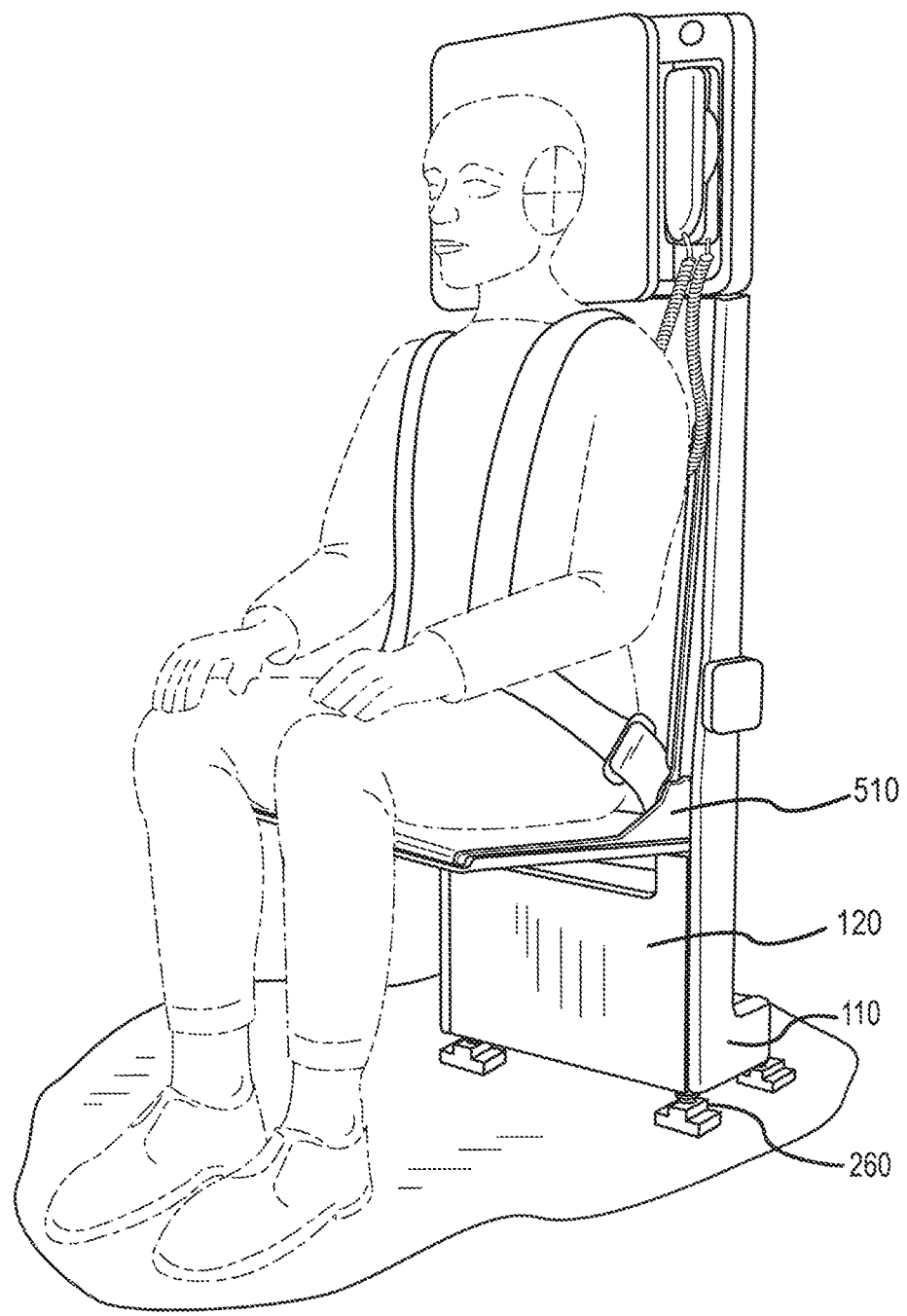
FIG. 5 illustrates an isometric view of a CAS and stow box comprising a hinge system according to various embodiments.

According to various embodiments and with reference to FIG. 1, an improved hinge system 100, such as a door 120 and hinge 150 for cabin attendant seat 510 (CAS) (with brief reference to FIG. 5) stow box 105 is disclosed. As described herein, a stow box is generally defined as a compartment having a hinged lid. Hinge system 100 may be configured to deform and allow the door 120 of the stow box 105 to remain in the closed position in response to the stow box 105 and/or CAS 510 being subject to stress and forces in a variety of directions. For instance, in response to a dynamic test the CAS 510 mounting points 260 (with brief reference to FIGS. 2, 3 and 5) may be warped, such as by applying a pitch and/or roll of about 10 degrees. This warping may create significant stress at the stow box 105 and/or door 120 hinge points. According to a variety of regulations, including the Federal Aviation Administration (FAA), a stow box 105 and/or door 120 hinge must be able to handle pitch and/or roll warp of about 10 degrees in addition to the normal dynamic loads and have minimal permanent deformation after the CAS 510 is un-warped and/or brought back to normal operating conditions.

According to various embodiments, hinge system 100 is configured such that high loads are not imparted on the hinge 150 latching points, such as on either the door 120 or the side wall of the stow box 105. Excessive loads at the latching points may cause deformation which could prevent and/or reduce ability of the door 120 from being operational after the dynamic test.

As previously mentioned, historical CAS stow box door hinge systems included several hinge halves and pins along with multiple pieces of hardware needed to attach the stow box door to the floor pan. Each side of the hinge halves are anchored to either the door or the housing. These conventional systems were not designed with flexibility and transmittal of excessive loads to the latching and mounting points in mind. Moreover, the high number of parts increases cost and weight of the system. Also, the high number of parts also increases assembly time and the number of points of failure.

Figure 2:
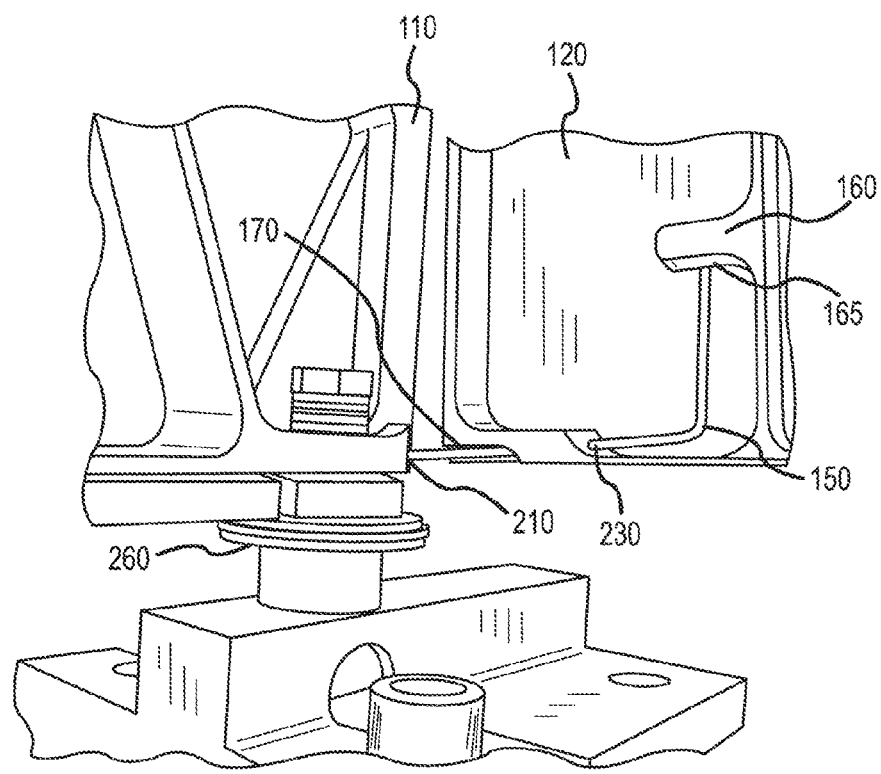
FIG. 2 illustrates a close-up view of an open CAS stow box comprising a hinge system according to various embodiments.
Figure 2:
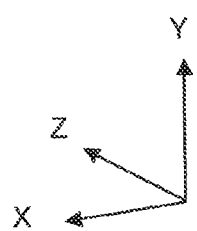

According to various embodiments, and with reference to FIGS. 1 and 2, hinge system 100 comprises a guide wire hinge 150. In general, guide wire hinge 150 may be a unitary member having a generally constant diameter, though other cross-sectional geometries are contemplated. Guide wire hinge 150 may be any desired length. Guide wire hinge 150 may be made from any desired material, but is preferably metallic and is desirably made from stainless steel. A pair of guide wire hinges 150 may be utilized to hingeably couple stow box door 120 to the stow box 105 housing. Stow box 105 housing may comprise a pair of sidewalls 110. Sidewalls 110 may be generally parallel to each other. The stow box 105 housing, such as within sidewall 110 may comprise an anchoring structure 210.

Anchoring structure 210 may comprise any desired structure configured for rotation and movement of guide wire hinge 150. For instance, the anchoring structure 210 may comprise a blind hole. In this context the blind hole may refer to a hole that is reamed, drilled, machined and/or milled to a specified depth, thus without breaking through to another side to create a through-hole. As should be appreciated within the scope of this disclosure, a through-hole with retention member is also contemplated for housing a first end of the guide wire hinge 150.

According to various embodiments, guide wire hinge 150 is fed through a through-hole 230 anchored to the stow box door 120. According to various embodiments, guide wire hinge 150 is fed through a channel 170 proximate through-hole 230. Channel 170 may be machined in relief from a portion of stow box door 120. Channel 170 may allow for guide wire hinge 150 to have freedom of movement along multiple axes Such as a in the X, Y, and/or Z planes. Channel 170 may comprise curved surface features to encourage deformation of guide wire hinge 150. Channel 170 may be configured to increase the degrees of freedom of the unitary guide wire in response to the unitary guide wire being in the channel 170 during a warping of the hinge system 100. Though channel 170 is depicted as being bounded by the front face of stow box door 120, according to various embodiments, a portion of the channel 170 may be entirely open to allow total freedom of movement. Stated another way, channel 170 may be made shorter adjacent to an open void to allow total freedom of movement of guide wire hinge 150.

Guide wire hinge 150 may bend from a first plane to a second plane substantially perpendicular to the first plane. A second end of guide wire hinge 150 may be press fit inside a track 165. Track 165 may comprise any geometric structure but may be a machined undercut/overhang/relief structure configured to at least temporarily retain the send end of guide wire hinge 150. Stated another way, track 165 may be machined from a portion 160 of stow box door 120, such as an aluminum extrusion, extending towards the interior of stow box 105 when stow box door 120 is in the closed position. Keyed features machined into the stow box door 120, such as track 165, allow the second end of the guide wire hinge 150 to be attached to the stow box door without additional fastening hardware and in general may serve to center the door between the pair of anchoring structures 210. Track 165, e.g., the undercut retention structure, may be configured to permit the second end of the unitary guide wire to have at least two degrees of lateral movement and rotation movement. Stated another way the end of the guide wire hinge 150 may float within and/or while being covered by the undercut retention structure.

In operation, per FAA certification requirements, crash tests are performed. During a crash test, one side of the CAS and/or stow box anchoring supports is pitched downwards at least 10 degrees. Similarly, the opposite is rolled approximately 10 degrees to simulate a buckled floor under the CAS. During this test, the seat is required to remain attached with the buckled floor and/or anchoring locations. The stow box door 120 is mandated to remain closed as part of this test. With the inclusion of the guide wire hinge 150 which is configured to be a flexible hinge, the high stresses do not result in a cracked door and/or failed retention mechanism resulting in an open stow box door. By configuring the guide wire hinge 150 to be deformable, the stresses upon the hinge are unloaded and substantially deformable guide wire hinge 150 may be configured to absorb the buckling of the floor. Stated another way, in response to the seat warping, the cantilevered stow box door 120 is designed to flex and/or bend and then return in general to its original shape after the warping is released. In general, after this test, the stow box door 120 will have a higher percentage of operability with the hinge system 100 design as compared with legacy designs.

Figure 3:
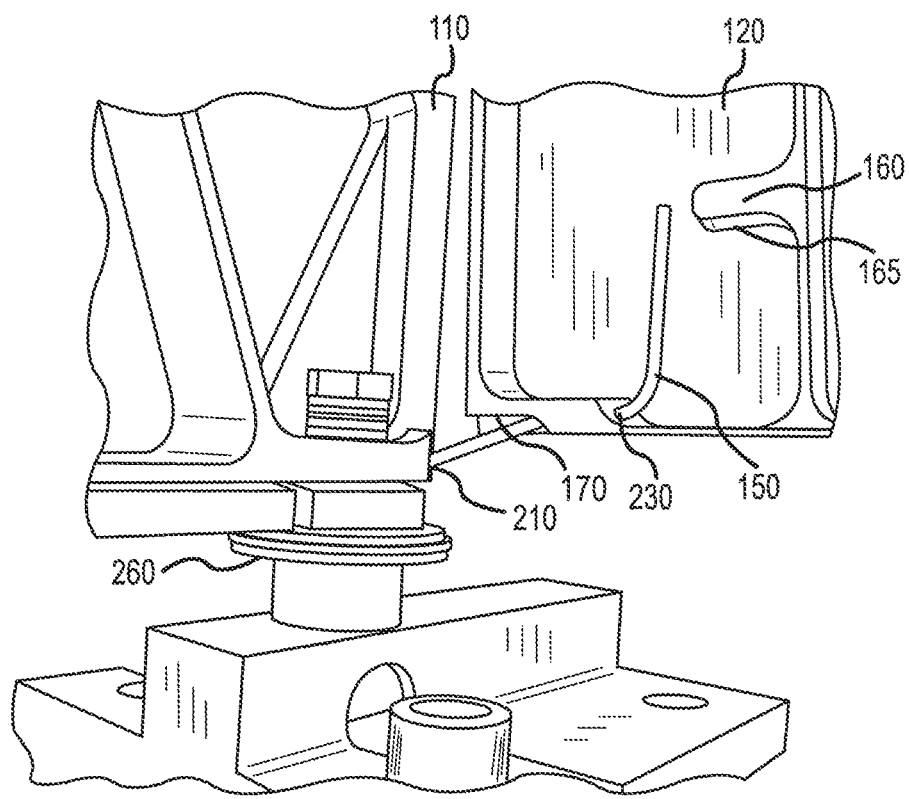
FIG. 3 illustrates a close-up view of a post warping open CAS stow box comprising a hinge system according to various embodiments.
Figure 4:
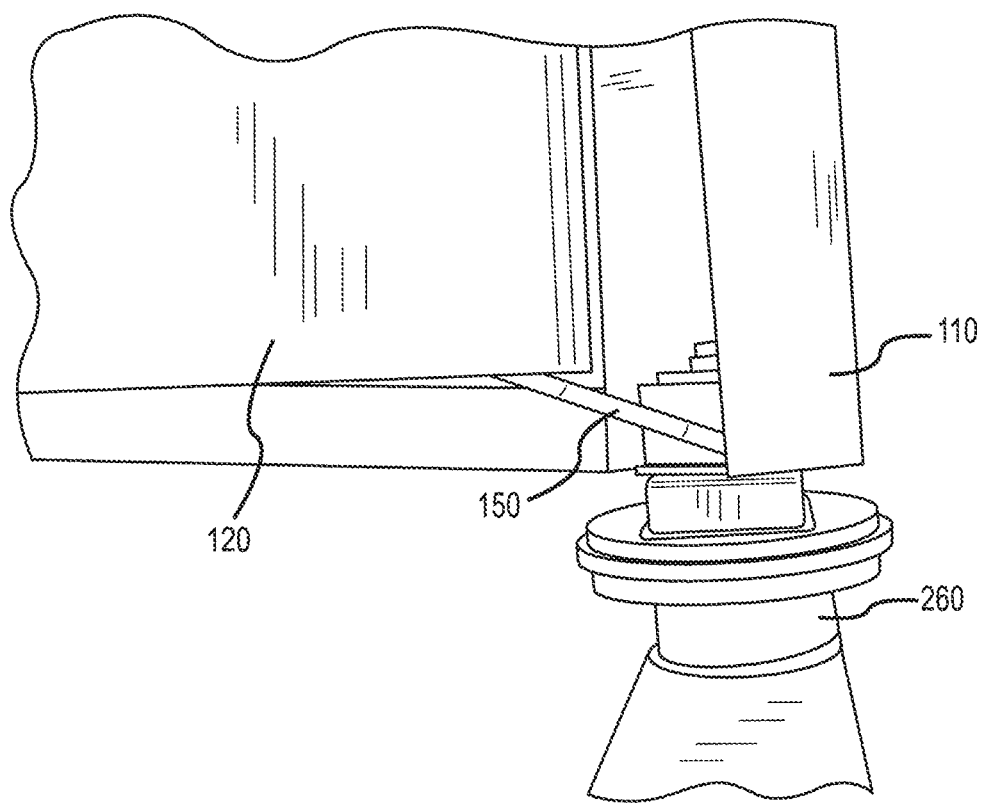
FIG. 4 illustrates a close-up back view of a post warping open GAS stow box comprising a hinge system according to various embodiments.

According to various embodiments and with reference to FIGS. 3 and 4, prior to, during and after CAS warping, track 165 allows the second end of guide wire hinge 150 to both slide and/or pivot such that the stress is not applied to the stow box door 120. FIGS. 3 and 4 depict a stow box door 120 post warping. While deformable guide wire hinge 150 may comprise a second angled portion, generally proximate channel 170 and/or through-hole 230, stow box door 120 has remained functional to open and close. Guide wire hinge 150 may exit track 165 as needed in response to the warping tests. In this way, the second end of guide wire hinge 150 is not permanently coupled to stow box door 120. Moreover, track 165 allows for second end of guide wire hinge 150 to remain engaged in and/or coupled to stow box door 120 without the use of more permanent anchoring structures which may transfer more stress.

According to various embodiments, the pressure provided by a pair of guide wire hinges 150 on stow box door 120 assist with the centering of the stow box door 120 as the hinges work to align the stow box door 120 towards the middle of stow box 105.

The benefit of this new system is increased flexibility and reduction of weight, cost, part count and assembly time. Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A guide wire hinge for connecting a door to a housing, comprising:
    a first end mated with a blind retention hole of the housing;
    a second end interfacing with an undercut retention structure defined by an interior surface of the door;
    a body having a cylindrical body encircled by a through-hole of the door; and
    an angled portion of the body comprising an angle of about 90 degrees, wherein the guide wire hinge is deformable in response to experiencing a warping.

2. The guide wire hinge of claim 1, wherein the door is a stow box door and the housing is a stow box.

3. The guide wire hinge of claim 1, wherein the blind retention hole is formed in a side of a housing.

4. The guide wire hinge of claim 1, wherein the guide wire hinge passes through the through-hole integral to an interior surface of the door with the through-hole encircling the body to prevent the body from moving laterally.

\* \* \* \* \*